(12) United States Patent
Van Straaten

(10) Patent No.: US 6,942,340 B2
(45) Date of Patent: Sep. 13, 2005

(54) OPTICAL APPARATUS

(75) Inventor: Willem Johannes Van Straaten, Sandton (ZA)

(73) Assignee: Greenhouse International LLC, Elkton, MD (US)

( * ) Notice: Subject to any disclaimer, the term of this patent is extended or adjusted under 35 U.S.C. 154(b) by 4 days.

(21) Appl. No.: 10/779,719

(22) Filed: Feb. 18, 2004

(65) Prior Publication Data

US 2005/0134794 A1  Jun. 23, 2005

(30) Foreign Application Priority Data

Dec. 18, 2003 (ZA) ................................. 2003/9783

(51) Int. Cl.$^7$ ........................... G02C 7/10; G02B 17/00
(52) U.S. Cl. ...................................... 351/163; 359/726
(58) Field of Search ................................ 351/163, 159, 351/41, 162, 165, 44–46; 359/726–732, 642, 359/629–634

(56) References Cited

U.S. PATENT DOCUMENTS 4,452,516 A * 6/1984 Salia-Munoz ................. 351/45
6,793,339 B1 * 9/2004 Yip et al. ..................... 351/163

* cited by examiner

Primary Examiner—Jordan M. Schwartz
(74) Attorney, Agent, or Firm—Wenderoth, Lind & Ponack, L.L.P.

(57) ABSTRACT

An optical apparatus for training a golfer which is the form of a pair of spectacles with tinted lenses, one of which is inclined so that an image projected onto an inner surface of the lens is reflected onto an eye of a user. The image comprises data which aids the golfer in a training stroke. To reduce ghost images, to allow for binocular vision and to superimpose the projected image on a background view, the lenses have an absorption of from 60% to 85%.

16 Claims, 2 Drawing Sheets

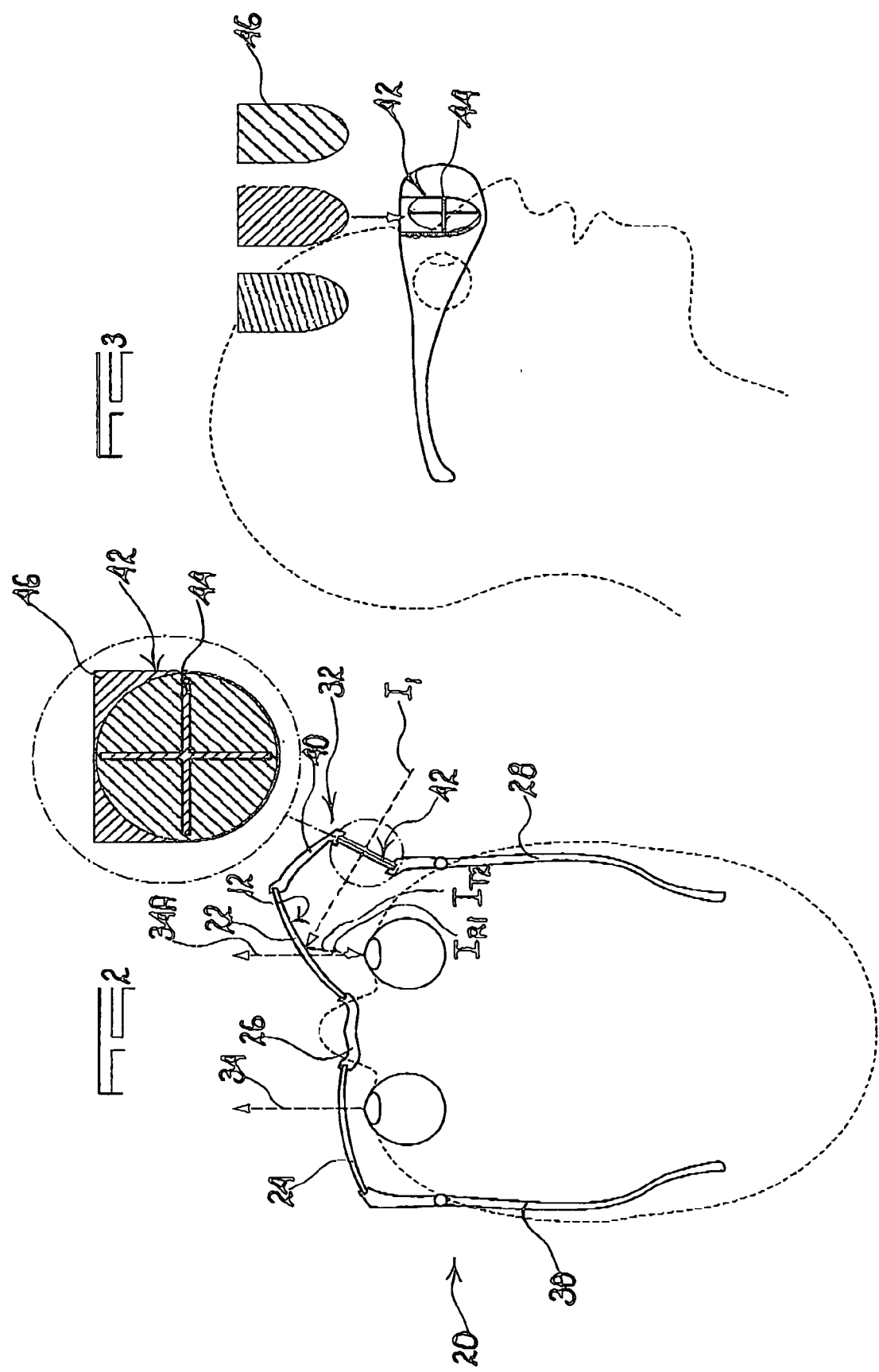

OPTICAL APPARATUS

BACKGROUND OF THE INVENTION

This invention relates to optical apparatus for creating an image against a background, which is particularly suitable for use as a training aid for a golfer.

It is desirable in various situations to have an image which is superimposed against a background view. For example a golfer, addressing a ball, can be assisted in his stroke if an image, which is visible only to the golfer, is superimposed on his normal field of vision. This type of situation is described for example in the specification of international application No. PCT/IB02/00953.

This international application describes a system wherein light is concentrated by a collector element and then passed through a reticle (a light grid) which directs an image onto a reflector which is in the nature of a beam splitter and which reflects light from the reticle towards an eye while at the same passing light in a direction from a normal field of vision. Normally the fabrication of a beam splitter, in the type of application referred to, requires the application of a light reflective coating to what may be referred to as an internal surface of a lens ie. a surface which faces an eye. The application of this type of light coating can be expensive and, if the coating is not of a satisfactory material, the coating can be easily damaged by scratching, abrasion or the like. A further factor with this type of lens is that the user's second eye, which does not receive the image from the reticle, is directly exposed to the general field of view. In other words one eye, which receives the image, views the general field of vision through a lens while no lens is positioned between the other eye and the general field of view. To some extent this imbalance is compensated for by an external lens or visor which covers both eyes but the overall appearance of the end product can be unacceptable to certain users. Also, the different light intensities on the eyes of a user can be disturbing and affect the user's vision and balance.

U.S. Pat. No. 3,498,293 describes a system which is used to orientate a person. Use is made of a lens which is mirrored or a beam splitter which is wavelength dependent ie. selectively reflective, and a gravity dependent device.

The problems encountered in orientating a user are quite different from those encountered in addressing a golf ball. In the specification of this patent reference is made to golf but there is no disclosure however of how a ball is to be targeted. The lenses in one embodiment are semi-transparent but there is no disclosure as to the further nature of the lenses.

It is known that semi-transparent lenses can generate ghost or secondary images but the problem associated therewith is not identified in the aforementioned American specification nor addressed.

U.S. Pat. No. 4,806,011 discloses a system wherein a small secondary lens, which is partly reflective, is used to project an image onto an eye of a user. The position of the secondary lens and its size can be problematic and can present a source of physical danger to a user.

In providing an optical apparatus which can be used as a golf training aid it is desirable to have a system which, as far as is possible, has the appearance of a normal pair of spectacles or sunglasses, which is not unreasonably bulky and which is relatively easy and inexpensive to manufacture.

SUMMARY OF INVENTION

The invention provides optical apparatus for creating a image on a background view which includes at least a first lens through which a user can see the background view with a first eye, which is light transmissive and which has an outer reflective surface at an interface of a first surface of the first lens with atmosphere and an inner reflective surface at an interface of a second surface of the first lens with the atmosphere, and a device for projecting an image onto the outer reflective surface which is orientated to reflect a first image of the projected image, of a first light intensity, onto the first eye and wherein the first lens is made from a lens material with an absorption A of at least 60% at least in the spectral range of 560 nm to 660 nm so that a second image of the projected image which is directed onto the first eye by the inner reflective surface has a second intensity which is less than 16% of the first intensity.

The lens material may have at least 60% absorption in the spectral range of 400 nm to 700 nm. Although the narrower spectral range (560 nm to 660 nm) substantially corresponds to the spectral range to which the eye is most receptive, however most people are receptive to images in a broader spectral range eg. from 400 nm to 700 nm.

In order to generate a satisfactory first image a compromise must be struck between a number of variable factors. The intensity of the second image, which may be referred to as a ghost image, must be substantially less than the intensity of the first or primary image. As is explained hereinafter the relative intensities can be manipulated by judicious choices of the absorption and the refractive index of the lens material. Sufficient light energy must be reflected from the outer reflective surface to create a primary image of acceptable intensity. This image should be preferably viewed against a contrasting background, which is formed by the first lens, so that it is readily visible.

In a general sense it can be said that as the absorption increases the intensity of the second image, relatively to the intensity of the first image, decreases. However as the absorption increases the capability of the lens to transmit light from the general field of vision to the eye is decreased. A further factor, referred to hereinafter, is that binocular vision ceases for a user if the light intensity on one eye varies by about more than 12% from the light intensity on the other eye.

To a considerable extent a compromise must be struck in respect of the aforementioned parameters on a largely subjective basis. Nonetheless it has been established through experimentation, when the absorption A is at least 60% and the ratio of the intensities of the two images is less than 16%, a passably acceptable situation results which can be use at least to some golfers.

Preferably the lens material has at least 70% absorption which carries with it the benefit that the second intensity is less than about 9% of the first intensity. The "strength" of the second image is thus significantly reduced.

Preferably however the lens material has between 80% to 85% absorption. This will ensure a signal (first image) to noise (second image) ratio which is greater than 25:1 ie. the second image has an intensity which is less than 4% of the intensity of the first image. This produces a highly satisfactory contrast between the first and second images.

According to a different aspect of the invention the first lens is made from a material with a refractive index n such that a light factor given by the expression $$\left[1 - \left(\frac{n-1}{n+1}\right)^2\right]^2 \cdot (1-A)^2$$

is less than 0.10.

Preferably the light factor is less than 0.05.

The first lens is preferably of substantially uniform thickness. The thickness of the first lens should be as small as is practicable and ideally the lens should be less than 2 mm in thickness. The reason for this is that the second image is moved closer towards the first image as the thickness of the lens is decreased. The effect of the second image may then be such that it results only in a small degree of blurring of the first image without creating a distinct and separate second image.

In order for the optical apparatus to be provided substantially in the form of a conventional pair of spectacles the apparatus preferably includes a second lens which is adjacent a second eye of the user and which is made from a lens material which is the same as the lens material from which the first lens is made.

The apparatus may include a support for the first and second lenses with the second lens being orientated, with respect to the user, so that a line of vision of the second eye is at a right angle to a surface of the second lens which opposes the second eye and with the first lens being orientated, with respect to the user, so that a line of vision of the first eye is at an acute angle to the first surface of the first lens on a side which is adjacent, ie. closer to, the second eye.

The device which is used for projecting the image may be of any appropriate type. Although it falls within the scope of the invention for the device to be an active device and to make use of a light source which is powered by means of a battery it is preferable to make use of natural or ambient light only for this purpose. The device may be of the kind described in PCT/IB02/00953. Preferably the device includes a shield with a light transmissive section or sections which define the image. The light transmissive section or sections may comprise lines or slits which define small openings in the shield. The light transmissive sections may be used together with a filter which may be variable or changeable thereby to change the colour of the image. This can be done to suit a user's requirements or to modify the light factor.

The shield and the lens may be shaped eg. curved, in an appropriate way to compensate for the lens shape so that the projected image, as seen by a user, includes straight lines.

If an active (battery-powered) image projection system is used then this, or at least the battery and the accompanying electronic components, may be removably engaged with the remainder of the apparatus.

BRIEF DESCRIPTION OF THE DRAWINGS

The invention is further described by way of examples with reference to the accompanying drawings in which:

FIG. 2 is a plan view of optical apparatus, in the nature of a pair of spectacles, according to the invention;

FIG. 3 is a side view of the apparatus of the invention; and

DESCRIPTION OF PREFERRED EMBODIMENT

Figure 1:
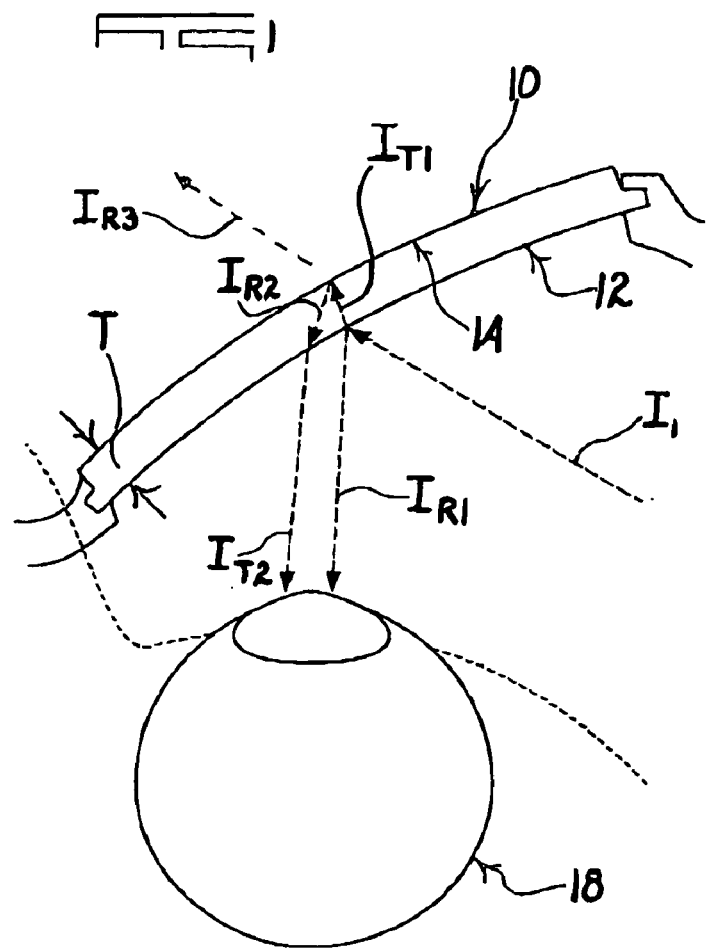
FIG. 1 is a cross sectional view of a lens illustrating a principle upon which the apparatus of the invention is based.

FIG. 1 of the accompanying drawings illustrates in cross section a lens 10 used in the apparatus of the invention. The lens is made from a light transmissive material eg. glass or a plastic such as polycarbonate, and has an outer reflective surface 12 and an inner reflective surface 14. The lens material has an absorption index A and a reflective index n. The lens is of uniform thickness T, where T is preferably $\leq 2$ mm.

FIG. 1 illustrates an incident light ray $I_1$ impinging on the outer reflective surface 12. The ray produces a first reflected ray $I_{R1}$ and a refracted ray $I_{T1}$. When the latter ray strikes the inner reflective surface 14 a ray $I_{R2}$ is reflected internally and this is refracted at the interface of the outer surface 12 with atmosphere to produce a ray $I_{T2}$. At the interface of the inner surface with atmosphere an outgoing refracted ray $I_{R3}$ is produced.

A person viewing the rays arising from the outer surface 12 will thus see, with an eye 18, a first, main image created by the ray $I_{R1}$ and a second, lesser image created by the ray $I_{T2}$. The images are not coincident and consequently there is a blurring of the main image which is constituted by the ray $I_{R1}$. It is therefore desirable to make the intensity of the image constituted by the ray $I_{T2}$ as small as possible relatively to the intensity of the main image created by the ray $I_{R1}$. This can be achieved by tinting the lens material, or by making use of a suitable material for the lens, so that the lens has an absorption of at least 60%, and preferably of between 80% to 85%, at least in the spectral range of 560 mm to 660 mm, and preferably in the spectral range of 400 mm to 700 mm. These parameters are chosen to ensure a signal (first image) to noise (second image) ratio which is greater than 6:1, which ratio may be regarded as a bottom "cut-off" point below which the image quality is unacceptable.

It can be shown that the ratio of the intensities of the two images, referred to herein as a "light factor", is given by the expression $$\frac{I_{T2}}{I_{R1}} = (1-R)^2(1-A)^2,$$

where R is the reflectance of the lens and is given by the expression $$\left(\frac{n-1}{n+1}\right)^2,$$

and

A is the absorption of the lens material.

If the ratio is reduced sufficiently at least to 0.16, but preferably to 0.05 or lower, an eye of a user, viewing the images, adapts and "sees" one image only, namely the dominant image constituted by the ray $I_{R1}$. This aspect is further described hereinafter.

The contribution to the light factor of the expression $(1-A^2)$, is shown for various absorptions as follows:

A=60%; light factor contribution=16%.
A=70%; light factor contribution=9%.
A=80%; light factor contribution=4%.
A=85%; light factor contribution=2.25%.

A typical lens material has a refractive index n from 1.1 to 1.5. For indices of 1.4 and 1.5 (by way of example only) the contributions to the light factor of the expression $(1-R)^2$ are:

n=1.4; contribution to light factor=97.8%
n=1.5; contribution to light factor=96%

It is evident that a primary or determining factor in reducing the ratio of the intensities of the two images is the absorption of the lens material. The expression $(1-R)^2$, which is also known as Fresnel's Law gives the reflection loss, at normal incidence, of a light ray on an interface of two media with different refractive indices. The reflection loss must clearly be sufficiently high to ensure that a primary image of adequate strength is generated at the outer surface 12 of the lens. The reflection loss is dependent on the refractive index of the lens material. Thus, generally, the greater the refractive index the brighter will be the primary image and, without being limiting the refractive index should preferably be at least 1.1.

If the refractive index is too high then images passing through the lens from the normal field of vision to the eye of a user can be distorted. Consequently a practical restraint is placed on the refractive index. Thus to get the light factor as small as possible the absorption A must be increased. Again however practical constraints arise in that a high absorption reduces the amount of light, falling on the eye, from the general field of vision, and this reduces the quality of the image of the general field as discernible by the eye. A second factor is that if the illumination intensities of two retinal images (the two eyes of a user) are unequal an undesirable effect known as the Pulfrich Phenomenon occurs. This phenomenon is noticeable if the difference between the amounts of light entering the two eyes is about 12% or greater for image suppression takes place and binocular vision ceases.

FIG. 2 illustrates in plan optical apparatus 20 according to the invention, which is in the nature of a pair of spectacles, and which is based on the aforementioned considerations.

The apparatus 20 includes a lens 22 which corresponds to the lens 10 shown in FIG. 1, a second lens 24, a central nose piece 26, arms 28 and 30 which are engageable with the ears of a user in a known manner, and an image generating device 32.

The lens 24 is more or less at a right angle to the normal line of vision 34 of the left eye of a user who is wearing the apparatus. The lens 22 on the other hand is inclined to the normal line of vision 34A for the right eye and the surface 12 of the lens, which directly opposes the eye, is at an acute angle (on the "nose" side) to the direction 34A (ie. on a side which is closer to the second eye). The inclination is such that, in relation to the image generating device 32, an image $I_1$ which is projected onto the outer reflective surface 12 by the device is directed ($I_{R1}$ and $I_{T2}$) onto the right eye of the user. Nonetheless the right eye is capable of looking through the lens 22 in a conventional manner, in the direction 34A, to view the background.

The device 32 has a small cup-shaped cover 40 and a curved shield 42. A number of curved thin slits or apertures 44, in the nature of gridlines, are formed through the shield in a desired pattern. The pattern is chosen in a manner which is consistent with the way in which the apparatus 20 is to be used. The shield and the apertures are curved in a manner which is dependent on the curvature of the lens so that an image projected by the device 32 onto the lens 22 includes straight (not curved) lines. The device 32 may optionally include one or more removable filters 46 which can be inserted into the cover at a position at which the filter is adjacent the shield. Each filter can for example be made from a suitably coloured plastics material. The arrangement is such that, with the filter in place, light of a particular colour passes through the gridline apertures 44 and, as noted, the colour can be chosen according to requirement. The use of the filter is optional for, in the absence of the filter, the light which passes through the gridline apertures is white light ie. natural light from the atmosphere.

The lens 22 is for all practical purposes the same as the lens 10 and is of substantially uniform thickness. The lens has an absorption A and the lens 24 has a similar absorption. Consequently the lenses transmit light of substantially the same intensity to the respective eyes of the user and the Pulfrich Phenomenon is avoided.

In one practical embodiment of the invention the lenses 22 and 24 are made from polycarbonate with a refractive index n=1.184. R is then calculated to be R= 0.0513.

The light factor is given by the expression $$\frac{I_{T2}}{I_{R1}} = (1-R)^2(1-A)^2.$$

Assume that A=0.85, at least for the spectral range of 560 nm to 660 nm.

$$\text{Thus } \frac{I_{T2}}{I_{R1}} = (1-0,0513)^2 \cdot (1-0,85)^2 = 0.02.$$

Thus the intensity of the secondary (ghost) image is about 2% of the intensity of the primary image and, to the average user, the ghost image is not noticeable.

The image $I_{R1}$ has an intensity of 5.13% of the intensity of the incident ray $I_1$, and the image $I_{T2}$ has an intensity of 0.02×5.13=0.1% of the intensity of the incident ray.

The image generation device 32 is used to project an image of a desired pattern onto the outer surface 12 of the lens and this is reflected as two images corresponding to the light rays $I_{R1}$ and $I_{T2}$ respectively, referred to in connection with FIG. 1, onto the right eye of the user. In the illustrated example only the right eye sees the image. Nonetheless the brain is capable of superimposing the projected image onto the normal field of vision, seen with both eyes (34 and 34A), and the user is unaware that one eye only is seeing the image. As the lenses 22 and 24 have substantially the same absorption index binocular vision is retained.

The image which is generated by the device 32 can be varied according to requirement and the colour thereof can be changed in an easy manner simply by changing the filter 46.

Figure 4:
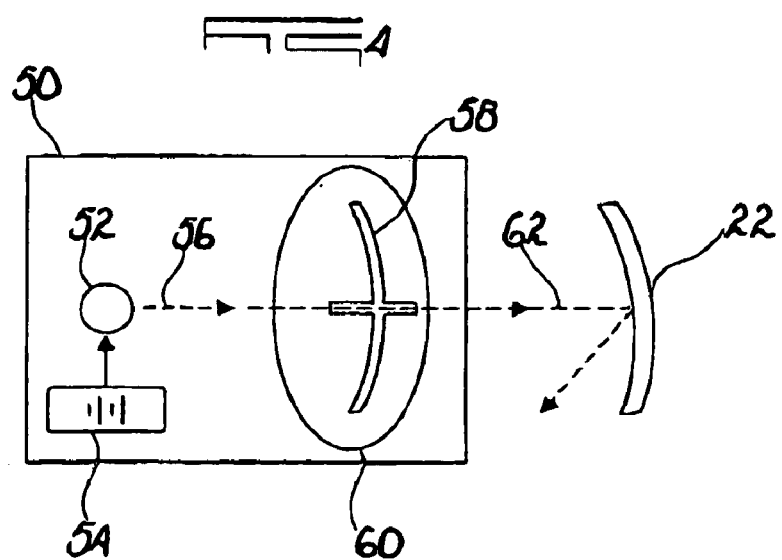
FIG. 4 schematically depicts a variation of the invention.

The device 32 makes use of ambient light to project the desired image onto the lens 22. It is possible to replace the device 32 with an active device 50, see FIG. 4, which includes a light source such as an LED 52 and a small battery 54 which powers the LED. Light 56 from the source then passes through a grid or pattern 58 on a shield 60 and the image 62 which is formed thereby is projected onto the lens 22. The device 50 may be removably attached to a suitable spectacle frame.

The appearance of the apparatus of the invention, as shown in FIG. 2, in many respects resembles the appearance of a conventional pair of spectacles. However the outwardly projecting lens 22 detracts from the "spectacle-type" appearance. The lenses 22 and 24 are however darkened and, apart from the fact that the device 32 projects an image onto one eye of the user the optical apparatus functions in substance the same as a pair of sunglasses. The light which is incident on the eye 18, from the general field of vision, traverses the lens 22 the surfaces of which are inclined to the direction 34A, unlike the surfaces of the lens 24 which are substantially normal to the direction 34. A small degree of refraction thus takes place in the image through the lens 22, from the general field of vision. To reduce distortion which may result therefrom the lens should, as indicated, be relatively thin eg. of the order of 2 mm or less.

The projected image may be varied according to requirement and may, generally, be of the nature described in PCT/IB02/00953.

What is claimed is:

1. Optical apparatus for creating a image on a background view which includes at least a first lens through which a user can see the background view with a first eye, which is light transmissive and which has an outer reflective surface at an interface of a first surface of the first lens with atmosphere and an inner reflective surface at an interface of a second surface of the first lens with the atmosphere, and a device for projecting an image onto the outer reflective surface which is orientated to reflect a first image of the projected image, of a first light intensity, onto the first eye and wherein the first lens is made from a lens material with an absorption A of at least 60% at least over the spectral range of 560 nm to 660 nm so that a second image of the projected image which is directed onto the first eye by the inner reflective surface has a second intensity which is less than 16% of the first intensity.

2. Optical apparatus according to claim 1 wherein the lens material has at least 60% absorption over the spectral range of 400 nm to 700 nm.

3. Optical apparatus according to claim 1 wherein the lens material has at least 70% absorption.

4. Optical apparatus according to claim 3 wherein the second intensity is less than 9% of the first intensity.

5. Optical apparatus according to claim 1 wherein the lens material has at least 80% absorption.

6. Optical apparatus according to claim 5 wherein the second intensity is less than 4% of the first intensity.

7. Optical apparatus according to claim 1 wherein the lens material has a refractive index n such that a light factor given by the expression $$\left[1-\left(\frac{n-1}{n+1}\right)^2\right]^2 \cdot (1-A)^2$$

is less than 0.10.

8. Optical apparatus according to claim 7 wherein the light factor is less than 0.05.

9. Optical apparatus according to claim 1 wherein the first lens is of substantially uniform thickness.

10. Optical apparatus according to claim 9 wherein the thickness of the first lens is less than 2.0 mm.

11. Optical apparatus according to claim 1 which includes a second lens which is adjacent a second eye of the user and which is made from a lens material which is the same as the lens material from which the first lens is made.

12. Optical apparatus according to claim 11 which includes a support for the first and second lenses with the second lens being orientated, with respect to the user, so that a line of vision of the second eye is at a right angle to a surface of the second lens which opposes the second eye, and with the first lens being orientated, with respect to the user, so that a line of vision of the first eye is at an acute angle to the first surface of the first lens on a side which is adjacent the second eye.

13. Optical apparatus according to claim 1 wherein the image projecting device includes a shield with at least one light transmissive section which defines the image.

14. Optical apparatus according to claim 13 wherein the light transmissive section is formed by at least one narrow slit in the shield.

15. Optical apparatus according to claim 13 which includes a filter adjacent the shield for imparting a desired colour to the image.

16. Optical apparatus according to claim 1 wherein the first lens is made from a lens material with a refractive index of at least 1.1.

\* \* \* \* \*